May 1, 1951 C. J. NORTON 2,550,715

SIGNAL AMPLITUDE LIMITING CIRCUIT

Filed Aug. 8, 1947

Clyde J. Norton INVENTOR.

BY Laurence Burns,

ATTORNEY

Patented May 1, 1951 2,550,715

UNITED STATES PATENT OFFICE 2,550,715

SIGNAL AMPLITUDE LIMITING CIRCUIT

Clyde J. Norton, Braintree, Mass., assignor to Sylvania Electric Products Inc., Salem, Mass., a corporation of Massachusetts Application August 8, 1947, Serial No. 767,589

11 Claims. (Cl. 178—44)

This invention relates to a limiter circuit wherein the voltage of a signal to be limited is prevented from exceeding a predetermined value.

It is an object of the invention to provide means for efficiently limiting the amplitude of a signal to a predetermined value.

A further object of the invention is to provide a limiter which functions uniformly and remains stable in operation throughout a wide range of electrical conditions.

A further object of the invention is to provide a means for limiting the amplitude of a signal to a predetermined value and providing for uniform gain from the limiting voltage down to zero amplitude.

A further object of the invention is to provide a limiter means having a very sharp limiting characteristic and capable of controlling and limiting high amplitude variations above the limiting value.

Other objects and features of the invention will more fully appear from the following description and will be particularly pointed out in the claims.

To provide a better understanding of the invention a particular embodiment thereof will now be described and illustrated in the drawings in which.

Figure 1:
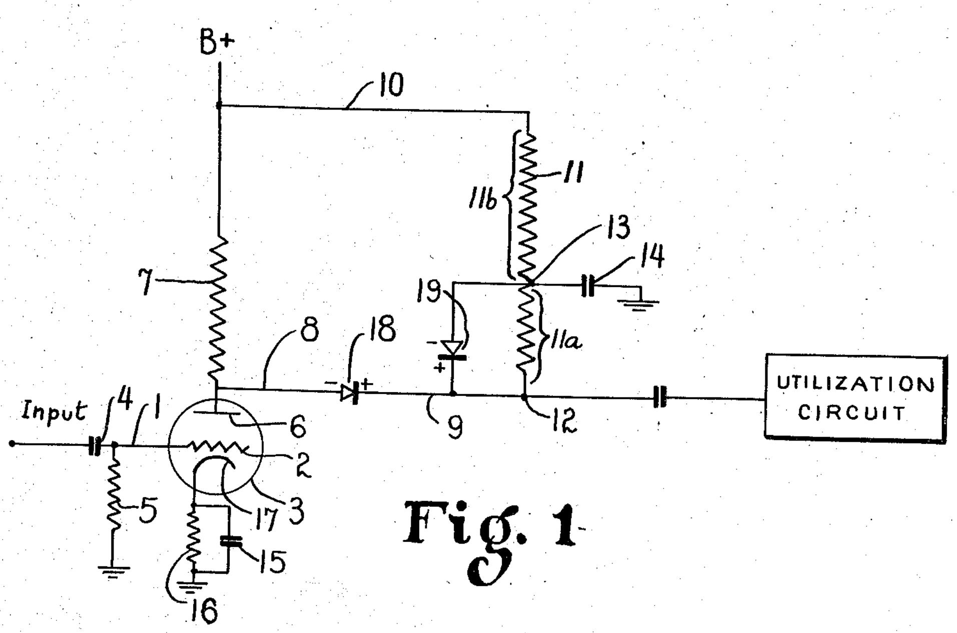
Figure 1 is a diagrammatic illustration of a circuit embodying the invention.

The invention is herein applied to a circuit suitable for limiting the amplitude of pulses in a conventional pulse type or other similar type input signal. The signal is impressed upon the input lead 1 connected to the grid 2 of an amplifier tube 3. A condenser 4 and resistor 5 are connected in the usual manner to provide the necessary coupling for the input circuit.

The plate 6 of the tube 3 is supplied with direct current of positive polarity from the B+ terminal supplied with power from a suitable source such as a battery not shown. This plate current is fed through a resistor 7. A lead 8 is connected directly to the plate terminal and extends to one terminal of a crystal diode 18 the other terminal of which is connected to the output lead 9 of the circuit from where the signal passes to a utilization circuit.

Another wire 10 is connected from the B+ terminal to one end of a resistor 11 the other end of which is connected to the output lead 9 at the point 12. A tap 13 is taken from the resistor 11 and led to ground through a relatively large condenser 14. The position of the tap 13 is chosen to produce a signal voltage drop between the tap and the output lead 9 equal to the desired maximum amplitude voltage of the output signal, more fully discussed below.

The plate current circuit is completed to ground through a resistor 16 and a condenser 15 connected to the cathode 17 of the tube 3 in the conventional manner.

A crystal diode 18 is connected, as above described, between the plate terminal and the point 12 with its polarity arranged to conduct plate current from the B+ terminal through the resistor 11 to the plate when no signal is being received.

Another crystal diode 19 is connected from the tap 13 to the output lead 9 with its polarity arranged to prevent shortcircuiting the portion of the resistor across which it is connected. The purpose of the crystal 19 will more fully appear hereinafter.

In operation the tube 3 functions normally as an amplifier tube. When a negative signal pulse is impressed upon the grid 2 an amplified or reproduced signal appears in the output lead 8. Without a limiting means the voltage of this amplified signal could reach the value of the voltage drop across the resistor 7. However, a limiting means is provided to limit the amplitude of the output signal to a predetermined desired value such as for example 6 volts which is substantially less than the voltage drop across the resistor 7.

A circuit is provided, shunting resistor 7, including wire 10 and resistor 11 in series with wire 9, crystal diode 18 and wire 8, this diode being polarized so that part of the normal plate current of tube 3 is passed by resistor 11. A condenser 14 is connected between tap 13 in resistor 11 and a stable potential point, the relative values of the condenser and the resistor portion 11*b* (bypassed by the condenser) being appropriate to maintain the tap at substantially constant voltage in the presence of signal output. Resistor portion 11*a* between tap 13 and output point 12 acts as a load preventing direct loss of the signal through condenser 14.

When a negative signal pulse is applied to the grid, currents passed by resistors 7 and 11*a* to the plate decrease proportionally, permitting the instantaneous voltage at the plate to increase, and the voltage at output point 12 follows faithfully. However, when the plate voltage instantaneously rises above that at tap 13, the high back resistance of the crystal diode 18 comes into effect, and point 12 no longer rises with the plate. The stable voltage of tap 13 can be adjusted by proper choice of circuit constants to limit the output voltage to any desired part of the available signal, as 6 volts.

Resistor 11 is not a conventional voltage divider where both ends would be at points of stable potential. The average value of the voltage at point 13 can vary subject to variations in the average current passed by tube 3. With a tube voltage divider, point 13 would be fixed and a slight rise or fade in the steady-state voltage at the plate would affect the limiting level to an extreme degree. In the circuit shown, the average voltage across resistor portion 11*b* will vary with variations in average or steady-state plate current, thus shifting the voltage at point 13 in the direction and substantially to the extent required to maintain the established limit level.

With the circuit so far described including the one diode 18, there may be an objectionable part of the signal excesses appearing at output point 12. This is because some signal current is passed by diode 18 through its high back resistance, which produces a drop across resistor portion 11*a*. To greatly improve the features of the clipping level, a diode 19 is connected across resistor portion 11*a* in a proper polarity to be forward conducting when diode 18 is to be blocked. Diode 19 offers very low resistance to signal excesses above the established level of tap 13, but otherwise offers high resistance to the desired signal output. Diodes 18 and 19 are thus connected in series opposition in the circuit including signal-applying resistor 7 and biasing resistor 11*b*.

Resistor portion 11*b* and condenser 14 can function with diode 19 (without diode 18) to achieve limiting action comparable to that of diode 18. Either diode is imperfect to a degree, and allows a small part of the signal excess to appear at point 12; each diode achieves a certain average percentage of perfection in limiting. However, the use of two diodes in series-opposition, connected to the stabilizing condenser, achieves not merely the cumulative effects of the two but the product of the two. For example, if one diode would permit $\frac{1}{10}$ of a certain signal excess to be developed at point 12, then the two would limit the excess to approximately $\frac{1}{10}$ of $\frac{1}{10}$.

In the above description of the invention crystal diodes have been used as asymmetric conductors. It should be noted however that any suitable means may be substituted such as other types of rectifiers.

Figure 2:
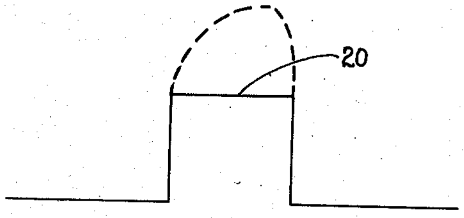
Figure 2 is a graphic illustration showing the manner in which the invention functions to limit the amplitude of a signal pulse.

Figure 2 shows graphically the manner in which a signal is limited. The full line represents a pulse of current the amplitude of which has been limited to a predetermined degree represented by the horizontal full line 20 at the peak of the pulse. The dotted line represents the amplitude of the pulse before passing through the limiter circuit.

What I claim is:

1. An electric circuit for limiting the amplitude of signals passed therethrough comprising an amplifier tube, energy supply means connected to said tube and including a positive B voltage supply connected to the plate of said tube, a first asymmetric conductor having one terminal connected to said tube plate, an output conductor connected to the other terminal of said asymmetric conductor, a resistor connected at one end to said positive B voltage supply and its other end connected to said output conductor, a voltage tap on said resistor and connected in the circuit to produce a voltage drop between the tap and said output conductor equal to the desired limiting voltage, a shunt condenser connected to said tap, and a second asymmetric conductor between said output conductor and said tap, said second asymmetric conductor being polarized to present high resistance to currents passed by said first asymmetric conductor in its forward-conducting direction.

2. An electric circuit for limiting the amplitude of signals passed therethrough having the elements defined in claim 1 and in which the asymmetric conductors are crystal diodes.

3. A signal limiting circuit comprising an input terminal, an output terminal and a common terminal, a rectifier connected between said input terminal and said output terminal, a second rectifier connected at one side to said output terminal, a condenser between the other side of said second rectifier and said common terminal, and a signal applying and bias-applying circuit between said other side of said second rectifier and the input terminal, said rectifiers being oppositely polarized so that the second rectifier will present its blocking impedance to signals passed by said first rectifier and so that signal excesses passed by said first rectifier in the high impedance direction will be readily conducted by said said second rectifier.

4. A signal limiting circuit in accordance with claim 3 wherein said signal and bias-applying circuit includes a first resistor bypassed by said condenser and a second resistor, and a vacuum tube having its plate connected to one end of said second resistor, the opposite end of said second resistor being connected to said first resistor and the positive terminal of the source of potential energizing said vacuum tube.

5. A clipping circuit including a signal input terminal, a reference terminal, and a signal output terminal, a series rectifier connected to said input terminal and to said output terminal for transmitting signals of less than a predetermined clipping level, an oppositely polarized shunt rectifier connected to the output-terminal side of said first rectifier to bypass signal excesses that may be transmitted by said series rectifier, and direct current potential applying means connected to said reference terminal and connected separately to each of said rectifiers with like bias polarity relative to said reference terminal to bias said shunt rectifier at one voltage into normally blocked condition and to bias said series rectifier at a different voltage into conducting condition for signals below clipping level, whereby signal excesses of polarity opposed to the bias on said series rectifier and in excess of the difference between said one voltage and said different voltage will render said series rectifier substantially nonconducting and such portion of the signal excesses as may be transmitted through said series rectifier will be bypassed from said output terminal via said shunt rectifier in its conducting direction.

6. A clipping circuit accordance to claim 5 wherein said rectifiers are crystal diodes.

7. A limiter circuit including an electron discharge device having an output electrode that normally draws a steady-state current, a load resistor connected between an output electrode of said electron discharge device and a point of stable potential, a circuit shunting said load resistor including a second resistor having one terminal connected to said point of stable potential and a diode connected between the opposite terminal of said second resistor and said output electrode, said second resistor having a tap, a condenser connected between said tap and a point of stable potential to provide biasing voltage, and an output circuit connected to said shunt circuit at a point between said second resistor and said diode, said diode being polarized so as to be normally conducting but to become largely non-conducting when the voltage at said output electrode exceeds the average voltage at said tap, said tap being free of any other connection preventing a rise and fall of its biasing voltages with average changes in signal voltage.

8. A limiter circuit including an electron discharge device having an output electrode that normally draws a steady-state current, a load resistor connected to said output electrode, a circuit shunting said load resistor including a second resistor having a tap, a condenser connected to said tap and to a point of stable potential to maintain a biasing voltage at said tap, and a diode connected to said tap and to the terminal of said second resistor nearer to said output electrode, said diode being polarized so as to be substantially non-conducting except when a signal at said output electrode exceeds the average voltage at said tap, said tap being free of any other connection preventing a rise and fall of its biasing voltage with average changes in signal voltage.

9. A limiter circuit including a grid-controlled electron discharge device having an anode, a load impedance between said anode and a direct current anode supply, a shunt circuit from said anode to said supply including, in series, a first diode, a first resistor, and a second resistor, a second diode shunting said first resistor, a condenser connected between a common connection of said first and said second resistors and a point of stable potential, and an output circuit between the common connection of said diodes, said first diode being polarized to be substantially conducting for signals of moderate amplitude and said second diode being polarized so as to be substantially non-conducting except during signal excesses.

10. A limiter circuit including an electron discharge device having an output electrode, a load resistor connected between said electrode and a point of stable potential, a circuit shunting said load resistor including a second resistor having a tap, a condenser connected between said tap and a point of stable potential, a first diode connected between said output electrode and a terminal of said second resistor, a second diode connected between said first diode and said tap, and an output circuit connected to the common connection of said diodes, said diodes being polarized so as to be series-opposing, and so that said first diode is conductive for signals of moderate levels.

11. A limiting circuit including a resistor and a diode connected in series between a point of stable potential and a signal input terminal, said diode being connected to said signal input terminal, a tap in said resistor, a condenser connected between said tap and a point of stable potential, a second diode connected between said tap and the common connection of said resistor and the first-mentioned diode, said diodes being polarized so as to be series-opposing, and an output circuit connected to said common connection.

CLYDE J. NORTON.

REFERENCES CITED

The following references are of record in the file of this patent:

UNITED STATES PATENTS

| Number | Name | Date |
|---|---|---|
| 2,215,175 | Fewings | Sept. 17, 1940 |
| 2,224,794 | Montgomery | Dec. 10, 1940 |
| 2,273,934 | Campbell | Feb. 24, 1942 |
| 2,353,018 | Duke | July 4, 1944 |